(12) United States Patent
Edpalm et al.

(10) Patent No.: US 10,616,592 B2
(45) Date of Patent: Apr. 7, 2020

(54) METHOD AND ENCODER FOR ENCODING A VIDEO STREAM IN A VIDEO CODING FORMAT SUPPORTING AUXILIARY FRAMES

(71) Applicant: Axis AB, Lund (SE)

(72) Inventors: Viktor Edpalm, Lund (SE); Hampus Linse, Lund (SE)

(73) Assignee: Axis AB, Lund (SE)

( * ) Notice: Subject to any disclaimer, the term of this patent is extended or adjusted under 35 U.S.C. 154(b) by 1 day.

(21) Appl. No.: 16/163,387

(22) Filed: Oct. 17, 2018

(65) Prior Publication Data

US 2019/0116371 A1    Apr. 18, 2019

(30) Foreign Application Priority Data

Oct. 18, 2017  (EP) ..................................... 17197037

(51) Int. Cl.

| | |
|---|---|
| *H04N 7/12* | (2006.01) |
| *H04N 19/31* | (2014.01) |
| *H04N 19/70* | (2014.01) |
| *H04N 19/167* | (2014.01) |
| *H04N 19/513* | (2014.01) |
| *H04N 19/59* | (2014.01) |

(52) U.S. Cl.
CPC ........... *H04N 19/31* (2014.11); *H04N 19/167* (2014.11); *H04N 19/513* (2014.11); *H04N 19/59* (2014.11); *H04N 19/70* (2014.11)

(58) Field of Classification Search
CPC .... H04N 19/31; H04N 19/167; H04N 19/513; H04N 19/59; H04N 19/70

USPC ..................................................... 375/240.12
See application file for complete search history.

(56) References Cited

U.S. PATENT DOCUMENTS

| | | | |
|---|---|---|---|
| 6,057,884 | A | 5/2000 | Chen et al. |
| 6,226,327 | B1 | 5/2001 | Igarashi et al. |
| 6,310,919 | B1 | 10/2001 | Florencio |
| 8,508,659 | B2 | 8/2013 | Bellers et al. |
| 2004/0120398 | A1 | 6/2004 | Zhang et al. |
| 2009/0103613 | A1 | 4/2009 | Jeon et al. |
| 2016/0286226 | A1 | 9/2016 | Ridge et al. |

(Continued)

FOREIGN PATENT DOCUMENTS

| | | |
|---|---|---|
| EP | 1 351 502 A1 | 8/2003 |
| EP | 3 038 370 A1 | 6/2016 |

OTHER PUBLICATIONS

"An Adaptive Divide-And-Predict Coding for Intra-Frame of H.264/AVC"; Yinji Piao et al.; 2009 16th IEEE International Conference on Image Processing (ICIP); Piscataway, NJ (USA); Nov. 7, 2009; pp. 3421-3424; XP031628523.

(Continued)

*Primary Examiner* — Nguyen T Truong
(74) *Attorney, Agent, or Firm* — Volpe and Koenig, P.C.

(57) ABSTRACT

A method and an encoder for encoding a video stream in a video coding format supporting auxiliary frames, where such auxiliary frames, in conjunction with the frames that reference the auxiliary frames, can be used to for rate control, in that the image data of the auxiliary frames comprises a down scaled version of an image data captured by a video capturing device, and that motion vectors of the frame referring to the auxiliary frame are calculated/determined to scale up the down scaled version of the image data to again have the intended resolution.

15 Claims, 5 Drawing Sheets

(56) References Cited

U.S. PATENT DOCUMENTS

2017/0034519 A1  2/2017  Rosewarne

OTHER PUBLICATIONS

Multi-Layer Extension of the High Efficiency Video Coding (HVEC) Standard; Ming Li et al; pp. 19-23; ZTE Communications, ISSN-1673-5188; vol. 14, No. 1, Feb. 2016.
EP 17197037.9 European Search Report ( dated Apr. 6, 2018).

METHOD AND ENCODER FOR ENCODING A VIDEO STREAM IN A VIDEO CODING FORMAT SUPPORTING AUXILIARY FRAMES

FIELD OF INVENTION

The present disclosure relates to the field of video encoding. In particular, it relates to a method and an encoder for encoding a video stream in a video coding format supporting auxiliary frames.

BACKGROUND

The past few years have witnessed a great popularity of digital and online videos and their applications. Streaming of video, both live video and recorded video, via, for example, internet, is getting more popular than traditional ways of viewing video such as television or rental of DVDs. A problem that may occur when streaming video is that the bandwidth of the internet connection over which the streaming is done is too low for the resolution (HD, 4K, 1080P, and the like) of the streamed video, or that the bandwidth of the internet connection is fluctuating. An insufficient bandwidth may cause the streaming video to stutter, which makes the video unwatchable due to lag. One way of preparing the video for being streamed on a limited bandwidth internet connection is rate control. Rate control plays an important role in video coding, where the rate control ensures the coded bit stream can be transmitted successfully and makes full use of the limited bandwidth. In other words, it is adjusting video output bits according to the fixed or variable bandwidth. Typically, rate control work with compression and frame rate, which often yields bad quality at low bitrates.

US 2004/120398 (Zhang et al.) disclose a method for adaptively encoding a video including a sequence of images, where each image is a picture of two fields. Each image of the video is encoded as a frame and rate-distortion characteristics are extracted from the encoded frames, while concurrently encoding each image of the video as two fields and rate-distortion characteristics are extracted from the fields. A parameter value λ of a cost function is determined according to the extracted rate-distortion characteristics, and a cost function is constructed from the extracted rate-distortion characteristics and the parameter λ. Then, either frame encoding or field encoding is selected for each image depending on a value of the constructed cost function for the image.

U.S. Pat. No. 6,226,3276 (Igarashi et al.) disclose an encoder that considers a frame representing a picture as comprised of areas. For each area, the encoder decides which of frame-based or field-based orthogonal transformation will be most efficient at reducing spatial redundancy in that area. For each area, the encoder decides which of frame-based or field-based predictive encoding will be most efficient at reducing temporal redundance in that area. The encoder encodes each area of the picture frame using the most efficient orthogonal transformation technique and using the most effective predictive encoding technique to produce an encoded signal. A decoder decodes the encoded signal. The encoded signal is recorded on a recording medium, transmitted over a transmission channel, or broadcast.

"An adaptive divide-and-predict coding for intra-frame of H.264/AVC" (Piao et al.) disclose an intra-frame coding scheme proposed for progressive video sequences in H.264/AVC. In the proposed method, every other pixel is sampled either in a horizontal or vertical direction without any anti-aliasing filtering, and two sub-frames of the even-pixel and odd-pixel are then generated. The even-pixel and odd-pixel sub-frames are coded by the intra- and inter-frame coding methods, respectively. The proposed method can be expanded into a multi-level case in which the even-pixel sub-frame is again sub-divided into an even-pixel sub-frame and an odd-pixel subframe, and so on to further improve the coding efficiency.

There is thus a need for improvements within this context.

SUMMARY

In view of the above, it is thus an object of the present disclosure to overcome or at least mitigate the problems discussed above. In particular, it is an object to provide an encoding method and an encoder which reduces the load on the resources of the video capturing system when complex transformations of the captured frames of a video stream are required and which facilitate retrieval of the originally captured image data.

According to a first aspect of the present disclosure, there is provided a method for encoding a video stream in a video coding format, wherein the video coding format supports including an auxiliary frame in the encoded video stream, the auxiliary frame being referenced by another frame in the encoded video stream and comprising image data complementing another frame in the encoded video stream, the auxiliary frame comprising a flag value indicating that the image data of the auxiliary frame is not intended to be shown when decoding the encoded video stream but instead used in conjunction with data of said another frame to achieve image data to be shown.

The method comprises: receiving first image data captured by a video capturing device; determining an intended resolution for the video stream when decoded; scaling down the first image data to obtain first scaled down image data, wherein the first scaled down image data has a first resolution lower than the intended resolution; preparing an empty first auxiliary frame, wherein the image data of the first auxiliary frame has a resolution equal to the intended resolution and comprises bits all having the same predefined value; pasting the first scaled down image data into the image data of the first auxiliary frame; encoding the first auxiliary frame as an intra frame; determining a first image transform for upscaling of the first scaled down image data in the image data of the first auxiliary frame to first upscaled image data having the intended resolution; determining first motion vectors by sampling the movement of pixels resulting from the first image transform in accordance with at least one predetermined macroblock size; and encoding the first image data to a first frame as an inter frame referencing the first auxiliary frame, wherein motion vectors of the first frame corresponds to the first motion vectors.

By an auxiliary frame is generally meant storage of an image data which complements another frame (also known as a master image) in the encoded video stream. In other words, said another frame references the auxiliary frame. The auxiliary frame can be used in various forms to assist in displaying the frame it complements but is not typically displayed as such. The auxiliary frame may as be referred to as auxiliary image, auxiliary image item, non-displayed frame, auxiliary picture etc. Known applications of an auxiliary frame include using it for an alpha plane or a depth map.

The first frame (and below the second, third, and the like) may thus also be called master image or master frame.

In this disclosure, the term "resolution" generally refers to the number of pixels in an image. Resolution is sometimes identified by the width and height of the image as well as the total number of pixels in the image. Another term for resolution is "size" or pixel dimensions.

By "intended resolution" is generally meant the resolution which the video stream is intended to be shown in, for example 4K, 1080P, 720P, DVD, VCD, 1920×1080, and the like. For example, a client may request a video stream in a certain resolution (e.g., 1080P), or the encoder may otherwise know which resolution the encoded video stream is intended to be decoded in, for example a hard-coded value in the encoder, or based on a IP address or similar of the requesting client. The intended resolution may also comprise a total amount of pixels and an aspect ratio, for example, 3.6 megapixels and 16*9. The intended resolution may according to some embodiments be based on a pixel density of an electronic image device on which the encoded video stream is intended to be shown.

By the term "image data of the first auxiliary frame has a resolution corresponding to the intended resolution" (and similar expressions for second, third frames, and the like) is generally meant that the size of the image data of the auxiliary frame corresponds to a size of an image having the intended resolution, for example, 1920×1080 for the intended resolution of 1080P.

Within for example the H.265 encoding standard (and other newer encoding standards such as Google's VP10), a frame can be tagged as "no-display", meaning that the frame is not to be displayed to the user. In H.265 for example, the tagging can be done by setting the pic_output_flag in the slice header to false or setting the no_display flag in the SEI header to true.

The teachings of this disclosure realize that such auxiliary frames, in conjunction with the frames that references the auxiliary frames, can be used to for rate control, in that the image data of the auxiliary frames comprises a down scaled version of an image data captured by a video capturing device, and that motion vectors of the frame referring to the auxiliary frame are calculated/determined to scale up the down scaled version of the image data to again have the intended resolution. The downscaling factor, in other words, the first resolution, can be determined to achieve a required reduction of the bit size of the encoded video stream. Since the downscaled image data of the auxiliary frame can be encoded using fewer bits compared to image data having the intended resolution, the needed bandwidth for transmitting the encoded video stream may be reduced. In this embodiment, the part of the image data of the auxiliary frame that does not comprise the downscaled image data will be empty and thus can be encoded using very few bits. For example, the step of encoding the first auxiliary frame as an I-frame may comprise using a first macroblock size for encoding the image data of the first auxiliary frame comprising the first scaled down image data, and a second macroblock size for encoding the image data of the first auxiliary frame not comprising the first scaled down image data, wherein the first macroblock size is smaller than the second macroblock size. Consequently, a further way of achieving rate control may be provided.

The present embodiment may further be advantageous in that the encoded video stream can be decoded by a standard video stream decoder that supports the video coding format used by the encoder since the above method follows the standard of such video coding format. Moreover, a user would benefit from being able to receive a low-resolution video stream in a standard compliant way, without having to restart the stream.

According to some embodiments, the method further comprises: receiving second image data captured by the video capturing device; scaling down the second image data to obtain second scaled down image data, wherein a resolution of the second scaled down image data is the first resolution; preparing a second empty second auxiliary frame, wherein the image data of the second auxiliary frame has a resolution equal to the intended resolution; pasting the second scaled down image data into the image data of the second auxiliary frame; encoding the second auxiliary frame as an inter frame referencing the first auxiliary frame; determining second image transform for upscaling of the second scaled down image data in the image data of the second auxiliary frame to upscaled image data having the intended resolution; determining second motion vectors by sampling the second image transform; and encoding the second image data to a second frame as an inter frame referencing the second auxiliary frame, wherein motion vectors of the second frame corresponds to the second motion vectors.

Some video compression standards, such as the video encoding formats described herein, prescribe temporal video compression implemented in terms of intra frames, for example, I-frames, and inter frames, for example, P-frames or B-frames. An intra-frame is basically an image frame that is encoded using only the information in the image frame to be encoded. Moreover, the intra-frame is calculated from all image data captured for the image frame to be encoded. Therefore, the intra-frame sometimes is referred to as a full frame. The inter-frames, also referred to as predictive frames or as differential frames, are based on information from previously (and optionally later) encoded image frames as well as the information of the presently encoded frame, in other words, the inter-frame may be described as taking advantage of temporally redundant information in previous (and optionally later) image frames. The encoder implementing this type of codecs (compression standards) typically generates an intra-frame followed by a predetermined number of inter-frames and then a new intra-frame followed by the same number of inter-frames. The length of this sequence of an intra-frame followed by a number of inter-frames is often referred to as Group of Pictures length (GOP-length). For some compression standards, for example, H.265, the GOP-length can be adjusted during encoding.

With the present embodiment, the encoding of the second auxiliary frame takes advantage of temporal video compression. The encoding of the second auxiliary frame thus takes advantage of temporally redundant information in the previous, first, auxiliary frame. The encoded second auxiliary frame may thus contain both motion vector displacements of the second image data in relationship to image data of the first auxiliary frame (i.e., first image data) and image data describing image content not present in the first auxiliary frame and predictions error (also referred to as residual values).

It should be noted that the above disclosed embodiment may be carried out in an iterative manner, meaning that it may be repeated for third, fourth etc. image data captured by the video capturing device according to the defined GOP-length. After this, a new sequence of an intra-frame followed by a number of inter-frames may be started. Consequently, according to some embodiments, the method further comprises: capturing third image data by a video recording device; scaling down the third image data to obtain third scaled down image data, wherein the third scaled down image data has a second resolution, the second resolution being different from the first resolution and lower than the intended resolution; preparing a third empty third auxiliary frame, wherein the image data of the third auxiliary frame has a resolution equal to the intended resolution; pasting the third scaled down image data into the image data of the third auxiliary frame; encoding the third auxiliary frame as an intra frame; determining a third image transform for upscaling of the third scaled down image data in the image data of the third auxiliary frame to third upscaled image data having the intended resolution; determining third motion vectors by sampling the third image transform; and encoding the third image data to a third frame as an inter frame referencing the third auxiliary frame, wherein motion vectors of the third frame corresponds to the third motion vectors.

Changing the downscale factor (second resolution being different from the first resolution) on a frame where a new GOP starts, leading to an inter frame encoded auxiliary frame, may be advantageous in that the inter frame is calculated from all image data of the auxiliary frame, and consequently not depending on a previous frame which was encoded based on a different downscale factor (first resolution). By allowing the downscale factor to change during encoding, the encoder can very swiftly react to new requirements regarding reduction of the size of the encoded video stream, for example a change in available bandwidth, thus providing an improved rate control. According to some embodiments, the GOP length is also changed during encoding, such that the encoder can adapt to a new requirement even faster.

According to some embodiments, the method further comprises: determining a section of the first image data, ROI1, to be included in the encoded video stream in a third resolution, the third resolution being higher than the first resolution; pasting the ROI1 having the third resolution in the image data of the first auxiliary frame such that the ROI1 does not overwrite the first scaled down image data or becomes overwritten by the first scaled down image data in order that the ROI1 does not overlap the first scaled down image data; determining a fourth image transform for inserting the ROI1 having the intended resolution in the first upscaled image data; determining fourth motion vectors by sampling the fourth image transform, wherein the encoding the first image data to the first frame as an inter frame comprises determining motion vectors of the first frame as corresponding to the first motion vectors and the fourth motion vectors.

In this embodiment, the empty portion of the image data of the first auxiliary frame is used for providing a higher resolution image data which may be of special interest for a viewer (or image analysis software), for example a face of a person or a license plate of a car. By reconfiguring the motion vectors of the first frame, a higher resolution can be achieved in the decoded video stream for any given region of interest of the image data captured by the video capturing device. The fourth motion vectors consequently maps the ROI1 into the correct position (corresponding to the position of the ROI1 in the first image data) in the first upscaled image data.

According to some embodiments, the method further comprises determining a section of the second image data, ROI2, to be included in the encoded video stream in the third resolution; pasting the ROI2 having the third resolution in the image data of the second auxiliary frame such that the ROI2 does not overwrite the second scaled down image data or becomes overwritten by the second scaled down image data; determining a fifth image transform from inserting the ROI2 having the intended resolution in the second upscaled image data; determining fifth motion vectors by sampling the fourth image transform, wherein the step of encoding the second image data to the second frame as an inter frame comprises determining motion vectors of the second frame as corresponding to the second motion vectors and the fifth motion vectors.

ROI2 is typically showing the same subject as ROI1, and this may be advantageous from an encoding perspective since the inter frame encoding of the second auxiliary frame is that case may be more effective. However, this is not always the case, the sections of the first and second image data that is determined to be included in a higher resolution version in the auxiliary frames may differ, for example showing a license plate in the first auxiliary frame and the face of the driver in the second auxiliary frame. The fifth motion vectors consequently maps the ROI2 into the correct position (corresponding to the position of the ROI2 in the second image data) in the second upscaled image data.

According to some embodiments, the ROI1 and ROI2 are pasted on corresponding positions into the image data of the first and second auxiliary frame, respectively. This may be advantageous from an encoding perspective when inter frame encoding the image data of the second auxiliary frame, since the search window of the block matching algorithm of the encoder then can be smaller, when the encoder search for similar macroblocks in the image data of the previous (first) auxiliary frame.

According to some embodiments, the third resolution is one from the list of: equal to the intended resolution, and larger than the intended resolution. This embodiment may increase the level of details for the ROI1 when decoded and displayed.

According to some embodiments, the intended resolution equals the resolution of image data captured by the video recording device. This may increase the flexibility of the encoding method, since the scale down factor can be varied such that the scaled down image data brings almost no loss of details compared to the captured image data (low scale down factor) down to a high loss of details (high scale down factor) depending on the requirements. However, the intended resolution may according to some embodiments also be lower than the resolution of image data captured by the video recording device.

According to some embodiments, the video coding format is one of the list of: High Efficiency Image File Format, High Efficiency Video Coding, H.265, H.264, VP10, VP9, AV1, Advanced Video Coding and H.266. However, it should be noted that any video coding formats supporting auxiliary frames as described herein are covered by the present teachings.

According to some embodiments, the method comprises determining the first resolution based on a bit rate of a digital network to which the encoder is connected. For example, the encoder and/or an rate controller may continuously receive reports regarding the bit rate from for example an application that pushes sustained traffic over a link between the encoder and a receiver of the transmitted video stream, and calculates an average over time. Another example of the bit rate is the maximum upload speed (a preset value) of the digital network to which the encoder is connected. By the term "bit rate" is generally meant the effective throughput of the digital network to which the encoder is connected. The above is equally valid for the second resolution. Other ways of determining the first/second resolution will be described below.

According to a second aspect of the present disclosure, the above object is achieved by a computer program product comprising a computer-readable storage medium with instructions adapted to carry out the method of the first aspect when executed by a device having processing capability.

According to a third aspect of the present disclosure, the above object is achieved by an encoder adapted for encoding a video stream captured by a video recording device in a video coding format, wherein the video coding format supports including an auxiliary frame in the encoded video stream, the auxiliary frame being referenced by another frame in the encoded video stream and comprising image data complementing another frame in the encoded video stream, the auxiliary frame comprising a flag variable indicating that the image data of the auxiliary frame is not intended to be shown when decoding the encoded video stream but instead used in conjunction with data of said another frame to achieve image data to be shown, wherein the encoder being further adapted to: receive first image data captured by the video capturing device, determine an intended resolution for the video stream when decoded, scale down the first image data to obtain first scaled down image data, wherein the first scaled down image data has a first resolution lower than the intended resolution, prepare an empty first auxiliary frame, wherein the image data of the first auxiliary frame has a resolution equal to the intended resolution and comprises bits all having the same predefined value, paste the first scaled down image data into the image data of the first auxiliary frame, encode the first auxiliary frame as an intra frame, determine a first image transform for upscaling of the first scaled down image data in the image data of the first auxiliary frame to first upscaled image data having the intended resolution, determine first motion vectors by sampling the movement of pixels resulting from the first image transform in accordance with at least one predetermined macroblock size and, encode the first image data to a first frame as an inter frame referencing the first auxiliary frame, wherein motion vectors of the first frame corresponds to the first motion vectors.

According to a fourth aspect of the present disclosure, the above object is achieved by a system comprising an encoder according to the third aspect, the encoder being connected to a decoder via a digital network, the decoder being arranged to decode a video stream encoded in the video coding format of the encoder, wherein the encoder is adapted to: receive the intended resolution via the digital network, receive a first resolution, encode the video stream according to the received intended resolution and the received first resolution, transmit the encoded video stream via the digital network, wherein the decoder is adapted to: receive the encoded video stream via the digital network, decode the encoded video stream to achieve a decoded video stream.

According to some embodiments, the system further comprises a display, wherein the encoder is further adapted to: determine a section of the first image data, ROI1, to be included in the encoded video stream in a third resolution, the third resolution being higher than the first resolution, paste the ROI1 having the third resolution in the image data of the first auxiliary frame such that the ROI1 does not overwrite the first scaled down image data or becomes overwritten by the first scaled down image data in order that the ROI1 does not overlap the first scales down image data, determine a fourth image transform for inserting the ROI1 having the intended resolution in the first upscaled image data, determine fourth motion vectors by sampling the fourth mage transform, wherein the encoding the first image data to the first frame as an inter frame comprises determining motion vectors of the first frame as corresponding to the first motion vectors and the fourth motion vectors, wherein the decoder is further adapted to: decode the encoded video stream to achieve a decoded video stream, wherein the decoding comprises extracting the ROI1 from the image data of the first auxiliary frame, and display the ROI1 separately from the decoded video stream on the display.

In this embodiment, a custom decoder is both decoding the encoded video stream according to the standard decoding method of a decoder supporting the video coding format of the encoder, and at the same time extracting the image data of the ROI1 from the first auxiliary frame to provide, for example, a still image or a second decoded video stream comprising the image data of the ROI1 (and optionally other regions of interest from subsequent auxiliary frames). This embodiment may be advantageous in that the region of special interest (ROI1) is shown separately, such that a viewer can see the image content of the ROI1 without being disturbed by the image content of remaining portion(s) of the image data from which the ROI1 was extracted. Separately displaying of the ROI1 may be particular advantageous in case the resolution of the decoded ROI1 is larger than the resolution of the decoded video stream and thus is scaled down when inserted in the image content of the decoded video stream. For this reason, according to some embodiments, the third resolution is larger than the intended resolution, wherein the step of displaying the ROI1 separately from the decoded video stream on the display comprises displaying the ROI1 in the third resolution on the display.

The second, third and fourth aspects may generally have the same features and advantages as the first aspect. It is further noted that the present teachings relate to all possible combinations of features unless explicitly stated otherwise.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The present teachings may, however, be embodied in many different forms and should not be construed as limited to the embodiments set forth herein; rather, these embodiments are provided for thoroughness and completeness, and fully convey the scope of the present teachings to the skilled person. The embodiments disclosed herein will be described during operation.

The present teachings aim at providing dynamic resizing of an ongoing video stream, for a video coding format that supports including an auxiliary frame in the encoded video stream. This gives a rate controller another possibility (except compression and frame rate) to work with when being required to lower the bit size (bit rate) of the encoded video stream, which may be particularly advantageous at low available bit rates. As an example, a low-resolution video stream (e.g., VGA video) while keeping the compression rate low (e.g., quantization parameter, QP, at 28) often yields a better quality compared to a high-resolution video stream (e.g., FHD video) with a high compression ratio (e.g., QP at 46) even though both encoded video streams have the same bit rate.

Figure 5:
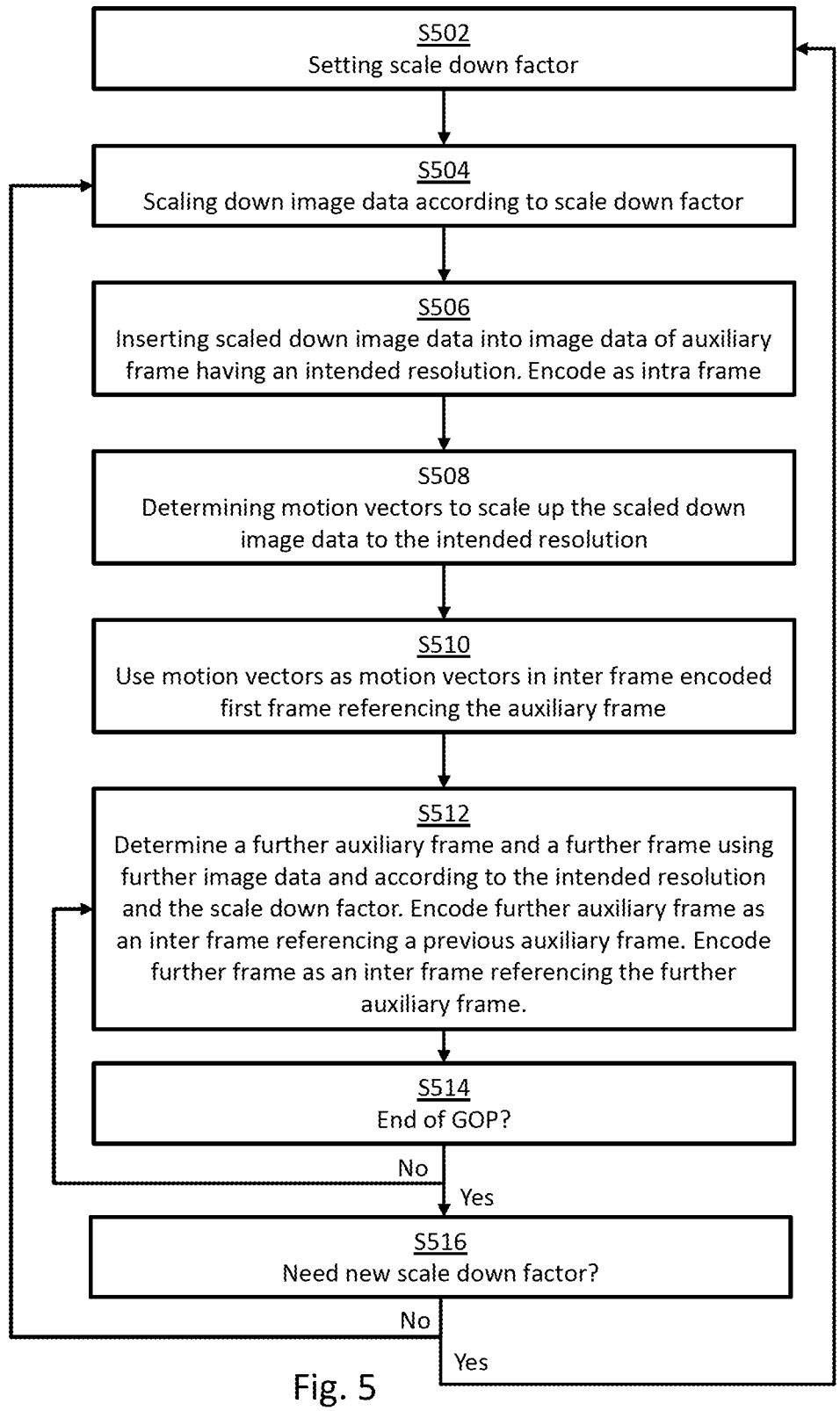
FIG. 5 is a flow diagram showing a method for encoding a video stream in a video coding format supporting auxiliary frames according to embodiments.

Embodiments of the present teachings will now be described in conjunction with FIGS. 1-2 and FIG. 5.

Figure 1:
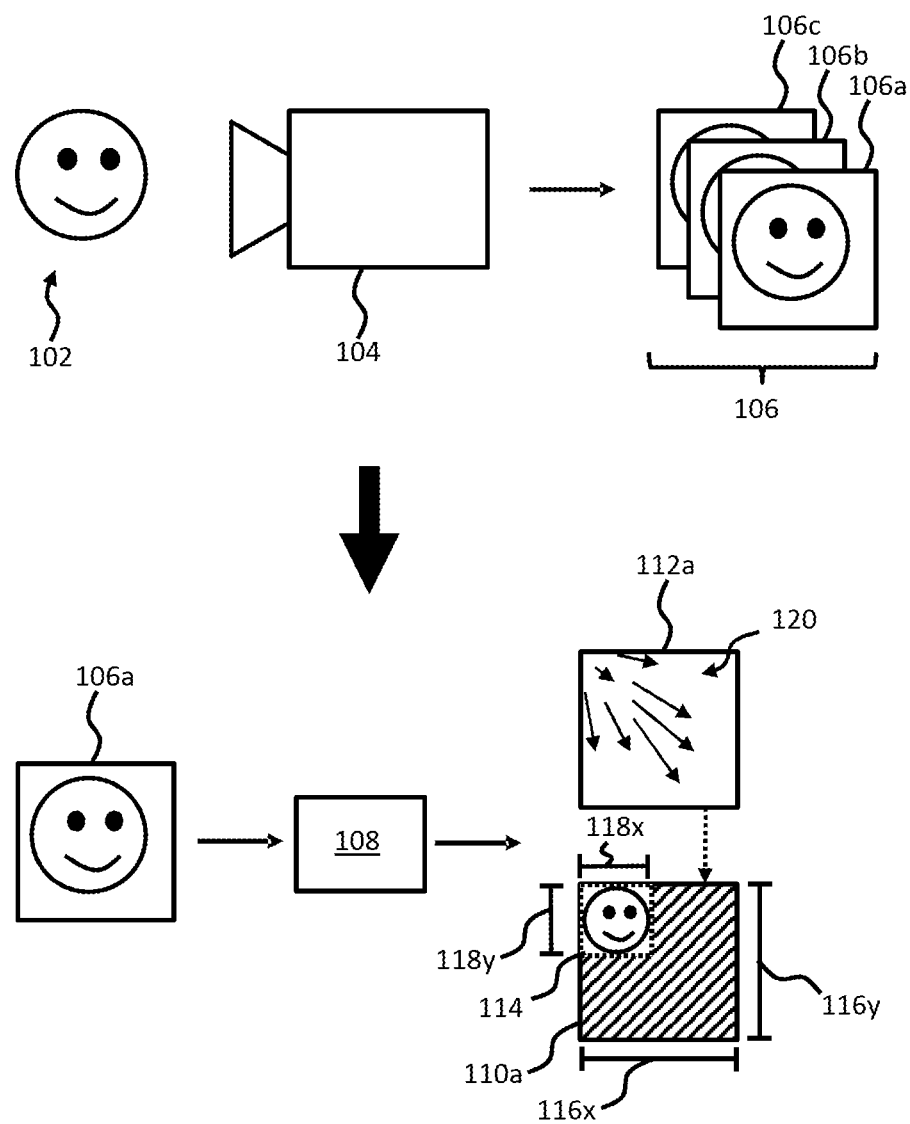
FIG. 1 schematically illustrates a first embodiment of a method for encoding a video stream in a video coding format supporting auxiliary frames.

FIG. 1 shows a scene 102 captured by a video capturing device 104 which results in a video stream 106 comprising three image frames 106a-c. The lower part of FIG. 1 exemplifies an embodiment of a method for encoding a video stream in a video coding format which supports including an auxiliary frame in the encoded video stream. An encoder 108 receives a first image data 106a captured by the video recording device 104. The encoder 108 determines an intended resolution for the video stream when decoded. As described herein, the intended resolution may equal the resolution of image data 106 captured by the video recording device 104. However, the intended resolution may also differ from the resolution of image data 106 captured by the video recording device 104. For example, the video recording device may capture video in a very high resolution, and the resolution which the encoded video stream is transmitted in, and later decoded in, may not need to be equally high. For that reason, the intended resolution may be lower than the resolution of image data 106a-c captured by the video recording device 104. The intended resolution may be known to the encoder in different ways. For example, the intended resolution may be a hardcoded value (e.g., in a memory of the encoder 108) which is retrievable from the encoder 108. The intended resolution may also be a configurable value in the encoder 108. The configuration may in that case, for example, be done by a user, or set from a device requesting the encoded video stream. Other ways of determining the intended resolution is of course possible.

The encoder then scales down S504 the first image data 106a to achieve first scaled down image data 114, wherein the first scaled down image data has a first resolution $118x*118y$ lower than the intended resolution. The downscaling may be performed using any known image scaling algorithm such as Nearest-neighbor interpolation, Bilinear and bicubic algorithms, Box sampling etc.

The first resolution may be determined/set S502 based on a bit rate of a digital network to which the encoder 108 is connected. The first resolution may further be set S502 according to a hardcoded value (e.g., in a memory of the encoder) which is retrievable from the encoder 108. The first resolution may also be a configurable value in the encoder. The configuration may in that case, for example, be done by a user, or set from a device requesting the encoded video stream. The first resolution is determined/set S502 such that the encoded video stream meets a bit rate requirement. The first resolution may be set S502 in an iterative way, such that the bit rate/size of the encoded video stream is continuously measured and the intended resolution is adapted based on the measurement and the bit rate requirement. In any event, the first resolution, which may also be referred to as scale down factor, is set S502 and used for scaling down received image data 106a-c.

The encoder 108 then prepares a first auxiliary frame 110a, wherein the image data of the first auxiliary frame 110a has a resolution $116x*116y$ corresponding to the intended resolution. The image data of the auxiliary frame 110a will at this point be empty (all bits having zero value), alternatively all bits will have a default value, for example corresponding to the color black, white or green. Having a default value corresponding to a predefined color may be advantageous from an encoder perspective. For example, the bitrate cost may be reduced in case the same value (color) is used everywhere, where the value being simple to encode (such as the color black, white or green). The first scaled down data 114 is then inserted S506 into the image data of the first auxiliary frame 110a which subsequently is encoded as an intra frame. In the example of FIG. 1, the first scaled down data 114 is inserted in the "top right corner" of the image data of the auxiliary frame 110a (the image data is visualized as a matrix in FIG. 1). However, the first scaled down data may be inserted at any position in the image data of the first auxiliary frame 110a, as long as the indexes of the bits belonging to the first scaled down data are remembered when later determining the first motion vectors (see below).

In order to later be able to scale up the first scaled down image data 114 to the intended resolution $116x*116y$, motion vectors 120 are determined S508. The motion vectors 120 corresponds to an upscaling (magnification of digital material is known as upscaling or resolution enhancement) of the first scaled down image data 114 in the image data of the first auxiliary frame 110a to first upscaled image data having the intended resolution $116x*116y$. The motion vectors will thus "move" macroblocks in the first scaled down data 114 to new positions in the first upscaled image data having the intended resolution. The algorithm for the actual upscaling at the decoder depends on the implementation of the decoder, but generally any known image scaling algorithm may be used, such as Nearest-neighbor interpolation, Bilinear and bicubic algorithms, Box sampling etc.

The upscaling is defined by an image transformation equation (image transformation, image transform, etc.) which is determined based on the intended resolution $116x*116y$, the first resolution $118x*118y$ and the way the first scaled down image data 114 is inserted in the image data of the auxiliary image 110a. The image transformation equation will, when applied to the first scaled down image data 114 (and second, third scaled down image data etc.), scale up the first scaled down image data 114 having the first resolution $118x*118y$ to image data having the intended resolution $116x*116y$. The motion vectors represent the image transformation equation, and may be determined in many ways. According to some embodiments, the motion vectors are determined by sampling the image transformation equation according to a determined macroblock size. For example, if the image transformation equation results in that a certain pixel should be moved 5 pixels to the right and 3 pixels down, the actual movement of this pixel is determined based on the sampling size (macroblock size) and the transformation for neighboring pixels. According to other embodiments, a plurality of macroblock sizes is used for the sampling, wherein the macroblock size used for a specific area of the mapping scheme depends on how the image transformation equation looks like for that corresponding area. For example, the macroblock size can be varied from 16×16 down to 4×4. This embodiment will lower the cost in bit rate for the motion vectors, and may in an efficient way use most bits for local areas of the image transformation equation where smaller macro blocks would result in a more correct sampling/mapping, and use less bits for local areas where the transformation is more uniform.

To further lower the cost in bitrate for the motion vectors, the sampling could be made sparser (increase the size of the macroblock), such that it is left to the decoder to interpolate between received motion vectors to calculate motion vectors for macroblocks of a smaller size, to achieve a smoother transformation of the image data in the auxiliary frames. This could be achieved by including an interpolation parameter in the encoded bit stream, or setting a flag in a header of a p-frame etc.

According to other embodiments, the sampling of the image transformation equation to achieve motion vectors is made based on the level of details in the corresponding area of the scaled down image data 114 in the auxiliary frame 110a. For example, for a local area in the scaled down image data 114 comprising a high degree of straight lines (can be determined using any suitable edge detection algorithm), a denser sampling (smaller macroblock size) may be needed for the corresponding area in the image transform. For areas with a lower degree of lines, a sparser sampling may be employed.

When the first motion vectors 120 are determined, a first frame 112a may be encoded S510 as an inter frame referencing the first auxiliary frame 110a (which is encoded as an intra frame as described above), wherein motion vectors 120 (schematically illustrated by the arrows in the first frame 112a) of the first frame 112a corresponds to the first motion vectors 120 determined as described above. It may be noted that the motion vectors 120 of the first frame 112a may be pre-calculated, and for example stored in memory accessible by the encoder. The ratio between the first resolution and the intended resolution may be used as a look up value in, for example, a database with ratios and corresponding motion vectors (the values in such database may assume that the scaled down image data is inserted in the image data of the auxiliary frame in a specific way, for example, in the top left corner or in the bottom left corner, and the like). The motion vectors may further be calculated at run-time of the encoder 108, based on the intended resolution and the first resolution as described above.

As described above, an advantage of the present teachings is that a standard decoder that supports the video coding format used by the encoder (e.g., H.265) can decode a video stream according to FIG. 1. The decoder will apply the motion vectors 120 of the first frame 112a to the first scaled down image data 114 of the first auxiliary frame 110a to achieve upscaling of the first scaled down image data 114 of the first auxiliary frame 110a and thus end up with decoded image data having the intended resolution 116x*116y.

Figure 2:
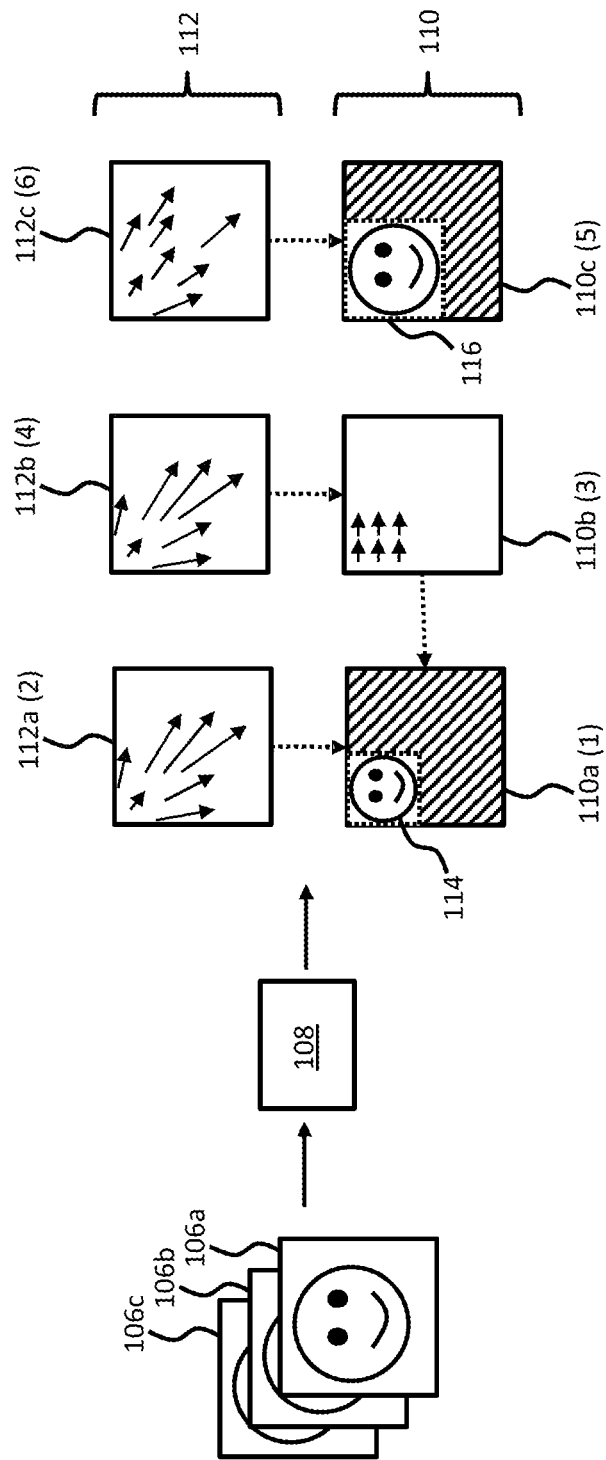
FIG. 2 schematically illustrates a second embodiment of a method for encoding a video stream in a video coding format supporting auxiliary frames.

FIG. 2 shows an extension of the method described in FIG. 1, where all three captured image frames (image data) 106a-c of the video stream 106 are encoded by the encoder 108. In FIG. 2, the first image data 106a is encoded as described in FIG. 1, and step S502-S510 in FIG. 5, to achieve an encoded first frame 112a and an encoded first auxiliary frame 110a. After encoding the first image data 106a, the encoder 108 receives second image data 106b. Image data of a second auxiliary frame 110b is compiled in a similar way as described above for the first auxiliary frame 110a.

The second auxiliary frame 110b is advantageously encoded as an inter frame (e.g., P-frame) referencing the first auxiliary frame 110a to take advantage of temporal redundant information in previous image frames, in this case the first auxiliary frame 110a. The encoding of the second auxiliary frame 110b is thus according to some embodiments made based on comparisons between the second image data 106b and the first image data 106a. In FIG. 2, the encoded second auxiliary frame 110b is schematically represented by motions vectors (in the top right corner) but image data describing image content not present in the image data of the first auxiliary frame but present in the second image data and/or predictions error (also referred to residual values) may of course also be included in the encoded second auxiliary frame 110b.

According to other embodiments, also the second auxiliary frame 110b is encoded as an I-frame.

The encoder 108 continues by encoding a second frame 112b referencing the second auxiliary frame 110b, the second frame being encoded as an inter frame. Motion vectors of the second frame are determined such that they correspond to an upscaling of the second scaled down image data in the image data of the second auxiliary frame 110b to second upscaled image data having the intended resolution. In this case, the motion vectors of the second frame 112b equals the motion vectors of the first frame 112a, since the second image data 106b is scaled down using the same scaling factor as for the first image data 106a, and the second scaled down image data is inserted in a position in the image data of the second auxiliary frame 110b corresponding to how the first scaled down image data 114 was inserted in the first auxiliary frame 110a. Consequently, the motion vectors of the second frame 112b may be determined by copying the motion vectors of the first frame. Any other way of determining the motion vectors of the second frame may be employed, as described above in conjunction with FIG. 1 for the first frame 112a. In other words, a further auxiliary frame 110b and a further frame 112b is determined S512 using further image data 106b and according to the intended resolution and the scale down factor/first resolution. The further auxiliary frame 110b is encoded as an inter frame referencing a previous auxiliary frame 110a. The further frame 112b is encoded as an inter frame referencing the further auxiliary frame 110b. As long as an end of a GOP is not reached (as determined in step 512 of FIG. 5), the above procedure S512 of encoding an inter frame encoded auxiliary frame and an inter frame encoded regular frame is repeated/iterated for the next image data in line (e.g., third image data 106c).

If the end of a GOP is reached (as determined in step 512 of FIG. 5), it is determined S516 if a new scale down factor is needed (e.g., has the requirements for bit rate changed such that a new scale down factor is needed to meet the new requirements, alternatively, was the previous scale down factor not enough to meet the current requirements). If not, the encoding procedure continues at step S504 for the next image data in line (e.g., third image data 106c).

An advantage of the present teachings is that dynamic resizing of the captured image data 106a-c can be achieved. Consequently, the encoder can very swiftly react to new requirements regarding reduction of the bit size (bit rate) of the encoded video stream, for example a change in available bandwidth. In the example of FIG. 2, for the third image data 106c, it is determined S516 that a new scale down factor is needed, and, in this example, a lower down scale factor is employed/set S502, for example, due to more available bandwidth or the like. Steps S504-S510 is then repeated with the new lower scales down factor. Since the down scaling factor has changed between the second image data 106b and the third image data 106c, it is advantageous to encode S506 a third auxiliary frame 110c as an intra frame. For the third image data 106c captured by the video capturing device 104, the encoding process according to this embodiment includes; scaling down S504 the third image data 106c to achieved third scaled down image data 116, wherein the third scaled down image data 116 has a second resolution, the second resolution (not shown in FIG. 2) being different from the first resolution (i.e., as shown in FIG. 1, 118x*118y) and lower than the intended resolution (i.e., as shown in FIG. 1, 116x*116y). A third auxiliary frame 110c is prepared, the image data of the third auxiliary frame 110c having the intended resolution 116x*116y, and the third scaled down image data 116 is inserted S506 into image data of the third auxiliary frame 110c which is intra frame encoded. The encoder then determines S508 third motion vectors (in FIG. 2 schematically illustrated by the arrows in a third frame 112c) corresponding to an upscaling of the third scaled down image data 116 in the image data of the third auxiliary frame 110c to the intended resolution 116x*116y. The third motion vectors may be determined as described above for the first frame 112a. After this, the encoder 108 can encode S510 the third frame 112c as an inter frame referencing the third auxiliary frame 110c, wherein motion vectors of the third frame corresponds to the third motion vectors.

In FIG. 2 (and similarly in FIGS. 3-4 below), the numbers within the parentheses describe the order in which encoded auxiliary frames 110 (AF) and "regular" frames 112 (RF) are included in an encoded video stream. For the example of FIG. 2, the order is: AF1 110a, RF1 112a, AF2 110b, RF2 112b, AF3 110c, RF3 112c.

A further advantage (except the dynamic rate control possibilities) of using only a part of the image data of the auxiliary frames 110 for transmitting the image data 106a-c captured by the image capturing device 104 is that the empty portion of the image data of the auxiliary frames 110 may be used for providing a portion 304 of the captured image data 106a-c in a higher resolution. Such portion is advantageously being of special interest for a viewer (or image analysis software), for example a face of a person or a license plate of a car. This embodiment is exemplified in FIG. 3.

Figure 3:
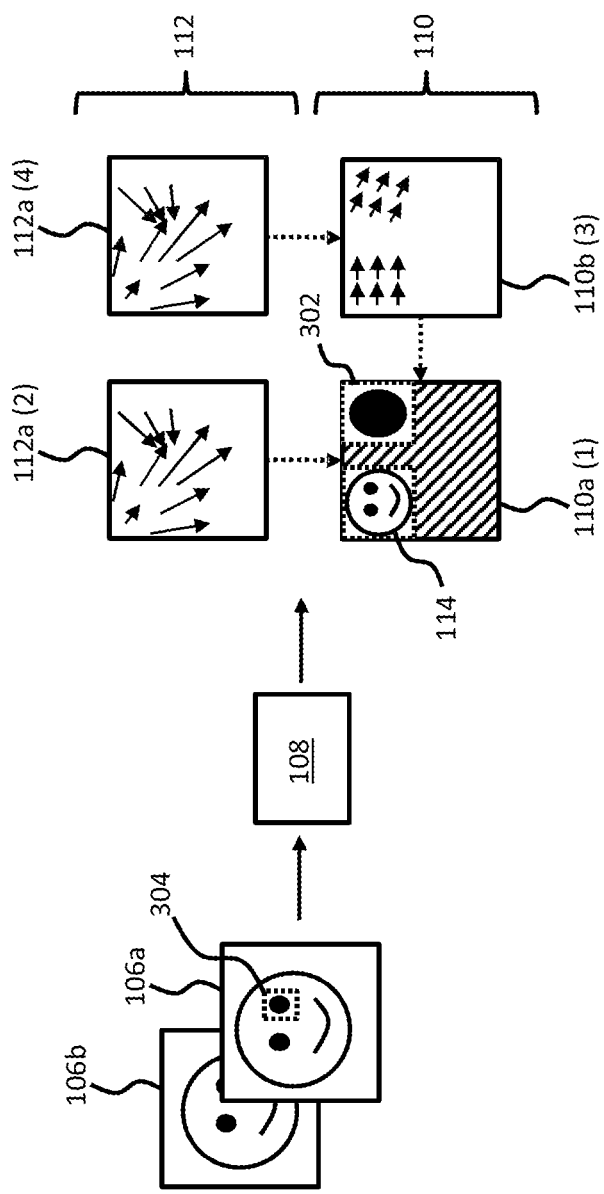
FIG. 3 schematically illustrates a third embodiment of a method for encoding a video stream in a video coding format supporting auxiliary frames.

In FIG. 3, a section 304 of first image data is determined. The section 304 is to be included in the encoded video stream in a third resolution, wherein the third resolution is higher than the first resolution. For example, if the first resolution is 720P, the third resolution may be 4K. According to some embodiments, the third resolution may be equal to the intended resolution. However, in case the image data 106a-b is captured in a resolution larger than the intended resolution, it may be advantageous if the third resolution is larger than the intended resolution, for example, equal to the resolution of the image data 106a-b captured by the video capturing device, or somewhere between the resolution of the image data 106a-b and the intended resolution.

After the section 304 has been determined, it is optionally scaled down to the third resolution (in case it is not already in the third resolution, i.e. if the third resolution is the resolution of the captured image data 106a). The section 304 in the third resolution will hereinafter be referred to as ROI1, and is shown in FIG. 3 having the reference 302. The ROI1 302 is then inserted in the image data of the first auxiliary frame 110a such that the ROI1 302 does not overwrite the first scaled down image data 114 or becomes overwritten by the first scaled down image data 114, in other words, such that the ROI1 302 will not overlap the first scaled down image data 114.

The next step is to determine (fourth) motion vectors corresponding to inserting the ROI1 302 having the intended resolution in the upscaled version of the scaled down image data 114. These motion vector can be determined in the same way as explained above for the first, second and third motion vectors, for example, by sampling an image transformation equation based on the third resolution, the intended resolution, and the location of the ROI1 in the image data of the first auxiliary image 110a. The fourth motion vectors are schematically shown in FIG. 3 as the arrows in the top right corner of the first frame 112a. The fourth motion vectors are then used for determining the motion vectors of the inter frame encoded first frame 112a. In other words, the step of encoding the first frame 112a as an inter frame comprises determining motion vectors of the first frame 112a which corresponds to the first motion vectors (for scaling up the scaled down image data 114 to the intended resolution) and the fourth motion vectors.

The first auxiliary frame 110a is still encoded as an intra frame.

For the second image data 106b, the encoding of a section of interest in this image data may be done taking advantage of temporal video compression as described above such that the second auxiliary frame 110b is encoded as an inter frame. For that reason, it may be advantageous if the section of the second image data in the third resolution, ROI2, is inserted on position in the image data of the second auxiliary frame 110b corresponding to the position of ROI1 in the image data of the first auxiliary frame 110a. ROI2 is inserted in the image data of the second auxiliary frame such that the ROI2 does not overwrite the second scaled down image data or becomes overwritten by the second scaled down image data. Then, fifth motion vectors corresponding to inserting the ROI2 having the intended resolution in the second upscaled image data is determined, and the encoding the second frame 110b as an inter frame comprises determining motion vectors of the second frame which corresponds to the second motion vectors and the fifth motion vectors.

The encoder 108 is thus adapted to encode the video stream 106, as described above in conjunction with FIGS. 1-3. The encoder 108 may be provided directly in video capturing device 104, or wired or wireless connected to the video capturing device 104 to receive the image data 106a-d of the video stream 106. The encoder 108 may comprise, or be connected to, a memory for retrieving pre-calculated motion vectors. The encoder 108 may comprise a processing unit for calculating image transformation equations (i.e., equations for upscaling of downscaled image data and/or equations for placing ROI1/ROI2 in the correct position and scale in the upscaled image data), and/or sample motion vectors from an image transformation equation. Alternatively, or additionally, the encoder may be adapted to receive image transformation equations and/or motion vectors from a separate calculation unit adapted to calculate/determine such image transformation equations and/or motion vectors. Such separate calculation unit may according to some embodiments create the entire first/second/third frame, which later is interconnected with the auxiliary frames in the encoder 108. The encoder 108 may further be adapted to down scale the image data 106a-d captured by the video capturing device 104 as described above. According to some embodiments, the encoder receives the scaled down image data from a separate scaling unit. The encoder typically comprises one or several processing units (e.g., a CPU) for encoding the received image data as described above. The CPU may for example be adapted to run software, installed from a computer-readable storage medium, with instructions adapted to carry out the encoding method of any of the above described embodiments when executed by the CPU. The encoder may further be adapted to transmit (via, for example, internet) the encoded video stream wireless or wired to a decoder adapted to decode the encoded video stream.

Figure 4:
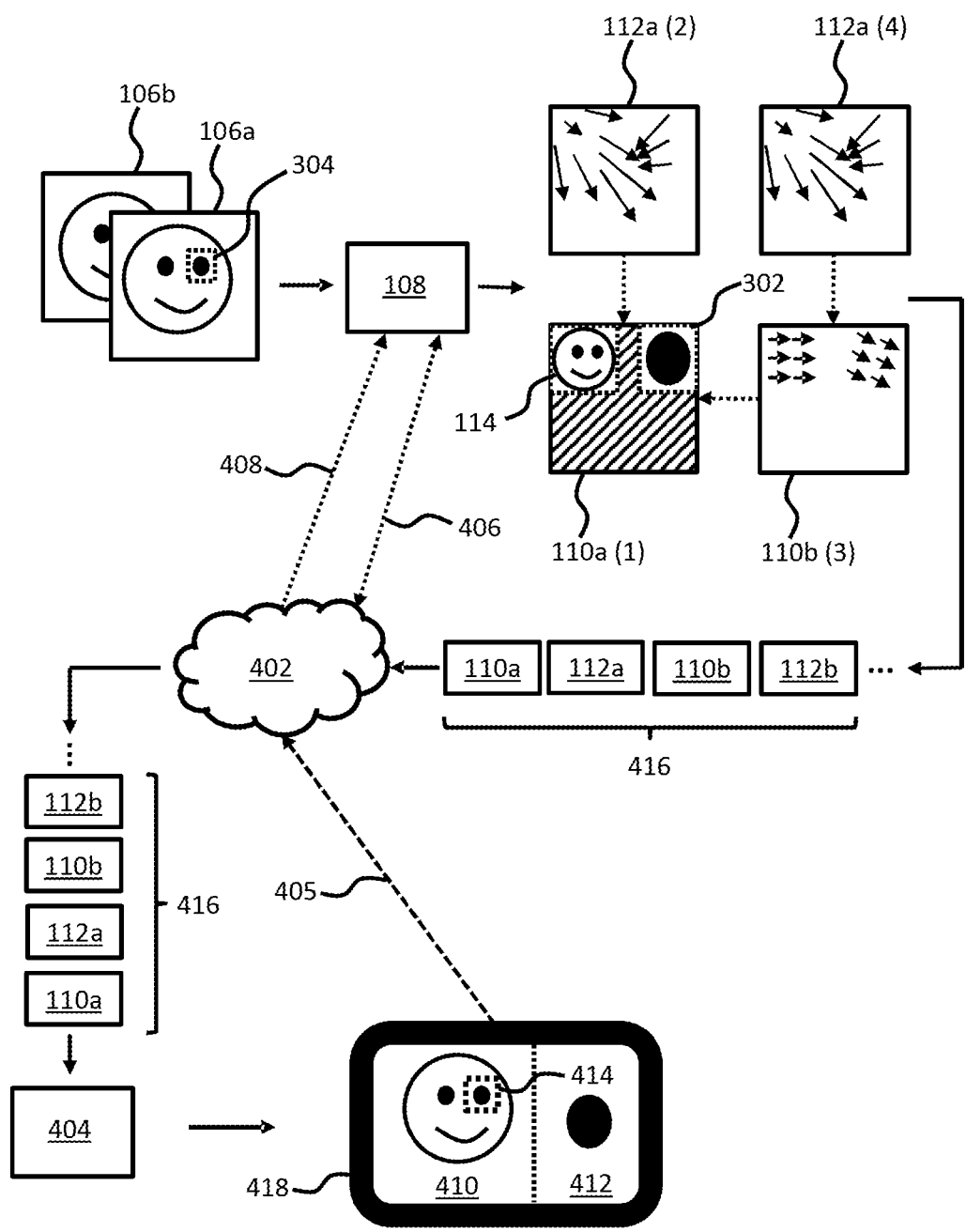
FIG. 4 schematically illustrates a system comprising an encoder according to FIG. 3, the encoder being connected to a decoder via a digital network, the decoder being arranged to decode a video stream encoded in the video coding format of the encoder.

FIG. 4 discloses by way of example a system comprising an encoder 108 as disclosed above. The encoder 108 is connected to a decoder 404 via a digital network 402, the decoder 404 being arranged to decode a video stream 416 encoded in the video coding format of the encoder 108. The video coding format may be one of the list of: High Efficiency Image File Format, High Efficiency Video Coding, H.265, H.264, VP10, VP9, AV1, Advanced Video Coding and H.266. However, it should be noted that any video coding format supporting auxiliary frames as described herein is covered by the present teachings.

The encoder 108 thus encodes the plurality of image data 106a-b captured by the video capturing device according to the intended resolution and the first resolution (down scale factor). The intended resolution may according to some embodiments be received 408 from the digital network 402, for example determined and transmitted 405 to the encoder via the digital network 402 by a client application 418 or user receiving the encoded video stream 416. The first resolution may be determined 406 based on a bit rate of a digital network to which the encoder is connected, in other words, an effective throughput of the digital network 402 between the encoder 108 and the decoder 404. Alternatively, it may be a separate rate control unit which determines the first resolution based on such bit rate, measured as described above. The rate control unit may continuously communicate the first (second etc.) resolution to the encoder, or communicate such resolution only if it is changed from what is currently used, for example, when bandwidth conditions are changed. The first resolution may be otherwise determined and received by the encoder 108. For example, the first resolution (and similarly the second resolution of FIG. 2) may be determined based on the quality of the video stream 106 captured by the video capturing device. If the video stream is captured in dark conditions, for example during night time, the video stream 106 (image data 106a-c) often comprises much noise, lowering the quality of the video stream, and thus making a lower first resolution advantageous compared to if the video stream 106 is captured during e.g. day time. Other example of determining the first resolution comprises receiving such information from a user which intends to watch the later decoded video stream, or from video analytics software which will analyze the later decoded video stream.

The encoder 108 is adapted for transmitting the encoded video stream 416 via the digital network 402. The decoder 404 is adapted to receive the encoded video stream 416 via the digital network 402, and decode the encoded video stream 416 to achieve a decoded video stream.

According to some embodiments, the system comprises a display 418. The decoder may be connected to the display 418 and transmit the decoded video stream to the display 418 to be shown 410 in the intended resolution.

According to the embodiment where a section 304 of first image data 106a is included is included 302 (herein referred to as ROI1) in the encoded video stream 416 in a third resolution as described above, the decoder 404 may be further adapted to decode the encoded video stream to achieve a decoded video stream, wherein the decoding comprises extracting the ROI1 from the image data of the first auxiliary frame, and displaying the ROI1 separately 412 from the decoded video stream on the display, for example in the third resolution (or any other resolution determined by the decoder 404). The ROI1 is also included 414 in the image data 410 taken from the auxiliary frames and upscaled using the motion vectors of, for example, the first/second frame 112a-b.

It will be appreciated that a person skilled in the art can modify the above-described embodiments in many ways and still use the advantages of the present teachings as shown in the embodiments above. For example, the order of encoding the auxiliary frames and the frames complementing the auxiliary frames can be changed in any suitable way. For example, all auxiliary frames within a GOP may be encoded first, before including inter encoded frames referencing the auxiliary frames interlacing with the encoded auxiliary frames in the encoded video stream. Thus, the present teachings should not be limited to the shown embodiments but should only be defined by the appended claims. Additionally, as the skilled person understands, the shown embodiments may be combined.

What is claimed is:

1. A method for encoding a video stream in a video coding format, wherein the video coding format supports including an auxiliary frame in the encoded video stream, the auxiliary frame being referenced by another frame in the encoded video stream and comprising image data complementing another frame in the encoded video stream, the auxiliary frame comprising a flag value indicating that the image data of the auxiliary frame is not intended to be shown when decoding the encoded video stream but instead used in conjunction with data of said another frame to achieve image data to be shown, the method comprising:

receiving first image data captured by a video capturing device;

determining an intended resolution for the video stream when decoded;

scaling down the first image data to obtain first scaled down image data, wherein the first scaled down image data has a first resolution lower than the intended resolution;

preparing an empty first auxiliary frame, wherein the image data of the first auxiliary frame has a resolution equal to the intended resolution and comprises bits all having the same predefined value;

pasting the first scaled down image data into the image data of the first auxiliary frame;

encoding the first auxiliary frame as an intra frame;

determining a first image transform for upscaling of the first scaled down image data in the image data of the first auxiliary frame to first upscaled image data having the intended resolution;

determining first motion vectors by sampling the movement of pixels resulting from the first image transform in accordance with at least one predetermined macroblock size; and encoding the first image data to a first frame as an inter frame referencing the first auxiliary frame, wherein motion vectors of the first frame corresponds to the first motion vectors.

2. The method of claim 1, further comprising:

receiving second image data captured by the video capturing device;

scaling down the second image data to obtain second scaled down image data, wherein a resolution of the second scaled down image data is the first resolution;

preparing a second empty auxiliary frame, wherein the image data of the second auxiliary frame has a resolution equal to the intended resolution;
pasting the second scaled down image data into the image data of the second auxiliary frame;
encoding the second auxiliary frame as an inter frame referencing the first auxiliary frame;
determining a second image transform for upscaling of the second scaled down image data in the image data of the second auxiliary frame to second upscaled image data having the intended resolution;
determining second motion vectors by sampling the second image transform; and
encoding the second image data to a second frame as an inter frame referencing the second auxiliary frame, wherein motion vectors of the second frame corresponds to the second motion vectors.

3. The method of claim 1, further comprising:
capturing third image data by a video recording device;
scaling down the third image data to obtain third scaled down image data, wherein the third scaled down image data has a second resolution, the second resolution being different from the first resolution and lower than the intended resolution;
preparing a third empty auxiliary frame, wherein the image data of the third auxiliary frame has a resolution equal to the intended resolution;
pasting the third scaled down image data into the image data of the third auxiliary frame;
encoding the third auxiliary frame as an intra frame;
determining a third image transform for upscaling of the third scaled down image data in the image data of the third auxiliary frame to third upscaled image data having the intended resolution;
determining third motion vectors by sampling the third image transform; and
encoding the third image data to a third frame as an inter frame referencing the third auxiliary frame, wherein motion vectors of the third frame corresponds to the third motion vectors.

4. The method of claim 1, further comprising:
determining a section of the first image data, ROI1, to be included in the encoded video stream in a third resolution, the third resolution being higher than the first resolution;
pasting the ROI1 having the third resolution into the image data of the first auxiliary frame such that the ROI1 does not overwrite the first scaled down image data or becomes overwritten by the first scaled down image data in order that the ROI1 does not overlap the first scaled down image data;
determining a fourth image transform for inserting the ROI1 having the intended resolution in the first upscaled image data; and
determining fourth motion vectors by sampling the fourth image transform,
wherein the step of encoding the first image data to the first frame as an inter frame comprises determining motion vectors of the first frame as corresponding to the first motion vectors and the fourth motion vectors.

5. The method of claim 4, further comprising:
receiving second image data captured by the video capturing device;
scaling down the second image data to obtain second scaled down image data, wherein a resolution of the second scaled down image data is the first resolution;
preparing a second empty auxiliary frame, wherein the image data of the second auxiliary frame has a resolution equal to the intended resolution;
pasting the second scaled down image data into the image data of the second auxiliary frame;
encoding the second auxiliary frame as an inter frame referencing the first auxiliary frame;
determining a second image transform for upscaling of the second scaled down image data in the image data of the second auxiliary frame to second upscaled image data having the intended resolution;
determining second motion vectors by sampling the second image transform;
encoding the second image data to a second frame as an inter frame referencing the second auxiliary frame, wherein motion vectors of the second frame corresponds to the second motion vectors;
determining a section of the second image data, ROI2, to be included in the encoded video stream in the third resolution;
pasting the ROI2 having the third resolution into the image data of the second auxiliary frame such that the ROI2 does not overwrite the second scaled down image data or becomes overwritten by the second scaled down image data;
determining a fifth image transform for inserting the ROI2 having the intended resolution in the second upscaled image data; and
determining fifth motion vectors by sampling the fourth image transform,
wherein the step of encoding the second image data to the second frame as an inter frame comprises determining motion vectors of the second frame as corresponding to the second motion vectors and the fifth motion vectors.

6. The method of claim 5, wherein the ROI1 and ROI2 are pasted on corresponding positions into the image data of the first and second auxiliary frame, respectively.

7. The method of claim 4, wherein the third resolution is one from the list of: equal to the intended resolution, and larger than the intended resolution.

8. The method of claim 1, wherein the intended resolution equals the resolution of image data captured by the video recording device.

9. The method of claim 1, wherein the video coding format is one of the list of: High Efficiency Image File Format, High Efficiency Video Coding, H.265, H.264, VP10, VP9, AV1, Advanced Video Coding, and H.266.

10. The method of claim 1, further comprising determining the first resolution based on a bit rate of a digital network to which the encoder is connected.

11. A non-transitory computer-readable storage medium including instructions which, when executed by a device having a processing capability, cause the device to execute instructions for encoding a video stream in a video coding format, wherein the video coding format supports including an auxiliary frame in the encoded video stream, the auxiliary frame being referenced by another frame in the encoded video stream and comprising image data complementing another frame in the encoded video stream, the auxiliary frame comprising a flag value indicating that the image data of the auxiliary frame is not intended to be shown when decoding the encoded video stream but instead used in conjunction with data of said another frame to achieve image data to be shown, the instructions causing the device to perform operations comprising:
receiving first image data captured by a video capturing device;

determining an intended resolution for the video stream when decoded;

scaling down the first image data to obtain first scaled down image data, wherein the first scaled down image data has a first resolution lower than the intended resolution;

preparing an empty first auxiliary frame, wherein the image data of the first auxiliary frame has a resolution equal to the intended resolution and comprises bits all having the same predefined value;

pasting the first scaled down image data into the image data of the first auxiliary frame;

encoding the first auxiliary frame as an intra frame;

determining a first image transform for upscaling of the first scaled down image data in the image data of the first auxiliary frame to first upscaled image data having the intended resolution;

determining first motion vectors by sampling the movement of pixels resulting from the first image transform in accordance with at least one predetermined macroblock size; and encoding the first image data to a first frame as an inter frame referencing the first auxiliary frame, wherein motion vectors of the first frame corresponds to the first motion vectors.

12. A video stream encoder configured to encode a video stream captured by a video recording device in a video coding format, wherein the video coding format supports including an auxiliary frame in the encoded video stream, the auxiliary frame being referenced by another frame in the encoded video stream and comprising image data complementing another frame in the encoded video stream, the auxiliary frame comprising a flag value indicating that the image data of the auxiliary frame is not intended to be shown when decoding the encoded video stream but instead used in conjunction with data of said another frame to achieve image data to be shown, wherein the encoder is further configured to:

receive first image data captured by the video capturing device;

determine an intended resolution for the video stream when decoded;

scale down the first image data to obtain first scaled down image data, wherein the first scaled down image data has a first resolution lower than the intended resolution;

prepare an empty first auxiliary frame, wherein the image data of the first auxiliary frame has a resolution equal to the intended resolution and comprises bits all having the sample predefined value;

paste the first scaled down image data into the image data of the first auxiliary frame;

encode the first auxiliary frame as an intra frame;

determine a first image transform for upscaling of the first scaled down image data in the image data of the first auxiliary frame to first upscaled image data having the intended resolution;

determine first motion vectors by sampling the movement of pixels resulting from the first image transform in accordance with at least one predetermined macroblock size, and encode the first image data to a first frame as an inter frame referencing the first auxiliary frame wherein motion vectors of the first frame corresponds to the first motion vectors.

13. A system comprising:
a video stream encoder; and a decoder, wherein the encoder is connected to the decoder via a digital network;

wherein the video stream encoder is configured to encode a video stream captured by a video recording device in a video coding format, wherein the video coding format supports including an auxiliary frame in the encoded video stream, the auxiliary frame being referenced by another frame in the encoded video stream and comprising image data complementing another frame in the encoded video stream, the auxiliary frame comprising a flag value indicating that the image data of the auxiliary frame is not intended to be shown when decoding the encoded video stream but instead used in conjunction with data of said another frame to achieve image data to be shown, wherein the video stream encoder is further configured to:
receive first image data captured by the video capturing device;

determine an intended resolution for the video stream when decoded;

scale down the first image data to obtain first scaled down image data, wherein the first scaled down image data has a first resolution lower than the intended resolution;

prepare an empty first auxiliary frame, wherein the image data of the first auxiliary frame has a resolution equal to the intended resolution and comprises bits all having the sample predefined value;

paste the first scaled down image data into the image data of the first auxiliary frame;

encode the first auxiliary frame as an intra frame;

determine a first image transform for upscaling of the first scaled down image data in the image data of the first auxiliary frame to first upscaled image data having the intended resolution;

determine first motion vectors by sampling the movement of pixels resulting from the first image transform in accordance with at least one predetermined macroblock size, and encode the first image data to a first frame as an inter frame referencing the first auxiliary frame wherein motion vectors of the first frame corresponds to the first motion vectors, wherein the decoder is configured to:
decode a video stream encoded in the video coding format of the encoder, wherein the encoder is adapted to:

receive the intended resolution via the digital network;

receive a first resolution;

encode the video stream according to the received intended resolution and the received first resolution;

transmit the encoded video stream via the digital network;

receive the encoded video stream via the digital network; and decode the encoded video stream to achieve a decoded video stream.

14. The system of claim 13, further comprising:
a display;
wherein the encoder is further configured to:
determine a section of the first image data, ROI1, to be included in the encoded video stream in a third resolution, the third resolution being higher than the first resolution;

paste the ROI1 having the third resolution into the image data of the first auxiliary frame such that the ROI1 does not overwrite the first scaled down image data or becomes overwritten by the first scaled down image data in order that the ROI1 does not overlap the first scaled down image data;

determine a fourth image transform for inserting the ROI1 having the intended resolution in the first upscaled image data;

determine fourth motion vectors by sampling the fourth image transform, wherein the encoding the first image data to the first frame as an inter frame comprises determining motion vectors of the first frame as corresponding to the first motion vectors and the fourth motion vectors;

wherein the decoder is further configured to:

decode the encoded video stream to achieve a decoded video stream, wherein the decoding comprises extracting the ROI1 from the image data of the first auxiliary frame; and display the ROI1 separately from the decoded video stream on the display.

15. The system of claim 14, wherein the third resolution is larger than the intended resolution, where the displaying the ROI1 separately from the decoded video stream on the display comprises displaying the ROI1 in the third resolution on the display.

* * * * *